United States Patent Office 3,803,243
Patented Apr. 9, 1974

3,803,243
OXIDATION OF SECONDARY AND TERTIARY ALKYL AROMATIC HYDROCARBONS
Arthur M. Brownstein, Cherry Hill, N.J., and David L. Kerr, Wilmington, Del., assignors to Sun Oil Company, Philadelphia, Pa.
No Drawing. Continuation-in-part of application Ser. No. 870,732, Sept. 18, 1969, which is a division of application Ser. No. 692,685, Dec. 22, 1967, which in turn is a continuation-in-part of application Ser. No. 663,234, Aug. 25, 1967, now abandoned. This application Apr. 21, 1970, Ser. No. 30,607
Int. Cl. C07c 73/06
U.S. Cl. 260—610 B          11 Claims

ABSTRACT OF THE DISCLOSURE

Copper polyphthalocyanine which has been activated by contact with an aromatic heterocyclic amine to form a novel complex is found to be an effective catalyst for the oxidation of secondary and tertiary alkyl aromatics such as ethylbenzene or cumene to form the corresponding hydroperoxide. The rate of conversion and the percentage yield is greater than that with copper phthalocyanine or copper polyphthalocyanine per se.

CROSS REFERENCE TO RELATED APPLICATION

This application is a continuation-in-part of application Ser. No. 870,732, filed Sept. 18, 1969, which is a division of application Ser. No. 692,685, filed Dec. 22, 1967, which in turn is a continuation-in-part of application Ser. No. 663,234, filed Aug. 25, 1967, now abandoned.

BACKGROUND OF THE INVENTION

This invention relates to a novel catalyst and to its use in an improved process for the oxidation of secondary and tertiary alkyl aromatic hydrocarbons such as ethylbenzene, cumene and the like to form the corresponding hydroperoxide. More particularly, this invention relates to the use of a novel copper polyphthalocyanine catalyst to improve the oxidation rate of secondary and tertiary alkyl groups on aromatic nuclei to form oxidation products such as α-cumyl hydroperoxide.

It is known that cumyl hydroperoxide can be produced very slowly by auto-oxidation when air or oxygen is rapidly passed through cumene warmed to about 80° C. Also, Canadian Pat. No. 510,517 teaches that the rate of oxidation of cumene can be enhanced when carried out in the presence of alkali or alkaline earth metal oxides or hydroxides, or in the presence of salts and oxides of heavy metals. Under these conditions, the conversion rate is only about 2 to 3 percent per hour. In addition, the reaction product contains substantial decomposition products such as acetophenone and dimethylphenyl carbinol.

U.S. Pat. No. 2,954,405 teaches the use of copper phthalocyanines as catalysts in the oxidation of substituted aromatics to form the corresponding hydroperoxides. However, this process is also characterized by a relatively low hourly conversion rate of about 3 to 4 percent. This reference does not teach or suggest the use of copper polyphthalocyanines as oxidation catalysts.

Soviet investigators, as reported in Dokladi Akademi Nauk SSR, 148, No. 1, pp. 118–121 (January 1963), found that copper polyphthalocyanine which was prepared by the reaction of pyromellitic acid or its anhydride with urea and cuprous chloride in the presence of ammonium molybdate catalysts, and which was washed with pyridine and dried at 250° C. to remove all impurities, also served as a catalyst for the oxidation of alkyl aromatics such as cumene to form the corresponding hydroperoxide. However, although the rates obtained by the Russian workers may be interpreted as being similar to those achieved in the present case, the cause of this apparent catalytic activity cannot be determined, nor their process practiced, in view of the fact that these results could not be reproduced when their method of preparing the catalyst was followed.

U.S. Pat. No. 3,300,399 describes the preparation of a copper polyphthalocyanine by heating pyromellitonitrile in the presence of a metal salt. The resulting material was finely powdered, washed with pyridine, reground and sublimated at a temperature of about 300° C. under vacuum for 24 hours in a manner similar to the Russian process. It is evident from the conditions of this treatment, and from the elemental analysis, that the residual product represented substantially pure copper polyphthalocyanine containing no pyridine complexed therewith.

SUMMARY OF THE INVENTION

It has now been found, in accordance with the present invention, that the rate of oxidation of secondary and tertiary alkyl aromatics to form the corresponding hydroperoxides can be substantially improved when there is employed a novel oxidation catalyst comprising a copper polyphthalocyanine which has been activated with an aromatic heterocyclic amine such as pyridine.

The novel catalysts employed in this process are formed by combining a copper polyphthalocyanine with an aromatic heterocyclic amine such as pyridine, quinoline, isoquinoline, triazine, pyrazine or the like. The catalyst may be prepared in one of several ways, as for example by grinding the crude, hard, brittle copper polyphthalocyanine to form a powder, washing it with a solvent such as pyridine and ethanol in order to remove copper salts, thoroughly drying the mixture in a sublimator at a temperature of about 210° to 250° C. for several days in order to remove all volatile impurities, including the pyridine, and then adding a measured amount of the aromatic heterocyclic amine to the pure copper polyphthalocyanine to form the novel catalyst.

Alternatively, the catalyst may be prepared by grinding and washing the copper polyphthalocyanine, using as the solvent the desired aromatic heterocyclic amine itself and then carefully drying the mixture in order to remove all but a measured amount of the amine solvent. In carrying out this latter process the drying time and temperature are dependent upon the particle size of the copper polyphthalocyanine, the coarser particles requiring more drying than do the finer particles. In general, drying the ground copper polyphthalocyanine at a temperature of 245° C. for about 96 hours has provided satisfactory results.

The catalyst, when prepared by the first method described above, is preferably formed in situ by the addition of the heterocyclic amine to the oxidation reaction medium containing the previously-powdered and dried copper polyphthalocyanine. The reason for this is that when the copper polyphthalocyanine-amine catalyst is allowed to sit for more than a few months, its effectiveness has been found to be measurably diminished. This is likewise true when the catalyst is made by other methods, in which case it is necessary to reactivate the copper polyphthalocyanine with additional amine before using it.

Regardless of how the catalyst is prepared, it is important that it contain from about 7 to 200 parts by weight of aromatic heterocyclic amine for each 100 parts of copper polyphthalocyanine, and preferably from 20 to 100 parts. Within these ranges, the particular quantity of amine employed in activating the catalyst has been found to be somewhat dependent upon the reaction temperature at which the oxidation is carried out: in general the amount of amine employed may be increased as the reaction temperature is decreased. Conversely, it is necessary to decrease the amount of amine if higher oxidation temperatures are utilized up to an optimum temperature of about 130° C. Beyond this temperature, excessive by-products start to form regardless of the amount of amine employed. It has further been found that if the amine content is reduced below the ratios set forth above, the activity of the catalyst is substantially reduced, while an increase in the amine content of the catalyst in excess of those of the above range results in extensive decomposition of the desired hydroperoxide product.

In a further embodiment of this invention, it has been found that, most surprisingly, after the normal decrease in the activity of the catalyst has taken place with the passage of time, this activity may very readily be restored to approximately its original level by the addition of the heterocyclic amine directly to the reaction medium, whereupon the catalytic activity is almost instantaneously restored. Moreover, it has further been found that this restoration may be effected many times during the life of the catalyst without any substantial loss of catalytic activity. The amount of heterocyclic amine which must be added to restore catalytic activity will naturally vary, depending upon the amount of the copper polyphthalocyanine in the medium, the time interval, and the like. Generally, however, it is sufficient if the amine is introduced in amounts not in excess of the weight ratios employed in the formation of the original polyphthalo-cyanine-amine catalyst, and preferably somewhat smaller amounts of amine should be employed.

While applicants do not wish to be bound by any particular theory, it is believed that the reaction product of the copper polyphthalocyanine and the heterocyclic amine is in the form of a complex of the two components rather than a sample admixture. Evidence for this has been adduced by the fact that catalytic activity rapidly decreases with decreasing heterocyclic amine to copper polyphthalocyanine ratios: whereas in continuous operations employing initially the preferred amine: polyphthalocyanine ratio, there is no observed decline in catalytic activity at a point where successive replenishment of the mother liquor with fresh reactant would have theoretically reduced the amine content far below the accepted level.

This catalyst complex, which is particularly distinguished by its ability to increase the rate of oxidation of secondary and tertiary alkyl aromatics, is a solid material at room temperature and is characterized by its high insolubility in most reaction media.

The copper polyphthalocyanine component of applicants' novel catalyst may be prepared in many different ways, and indeed, depending upon the manner of its preparation, may have different properties and characteristics. Thus, for example, the preparation of one form of copper polyphthalocyanine, which is formed by the reaction of pyromellitonitrile with a copper salt such as cuprous chloride, is disclosed in British Pat. No. 883,552. Briefly, this catalyst may be prepared by various methods, as for example, by reacting an excess of pyromellitonitrile with finely divided cuprous chloride in an inert, oxygen-free atmosphere, at elevated temperatures of about 300 to 400° C. and elevated pressures of about 2000 to 3000 p.s.i. for several hours. Small amounts of urea may be added, if desired, in order to neutralize any resulting hydrogen chloride. The resulting material is characterized by its dark blue color, its graphite-like consistency, and its substantial insolubility in most solvents, including sulfuric acid.

Another known form of copper polyphthalocyanine is described in the aforementioned Soviet journal, Doklady Akademi Nauk. The copper polyphthalocyanine described in that article is prepared by the reaction of pyromellitic dianhydride with urea and a copper salt such as cuprous chloride, in the presence of ammonium molybdate catalyst, and is notably soluble in concentrated sulfuric acid. This latter product is further characterized in that its I.R. spectrum shows strong carbonyl bands at 5.63 and 5.80 microns, while the copper polyphthalocyanine prepared from pyromellitonitrile shows no carbonyl bands, but does show a weak nitrile group at 4.45 microns.

Notwithstanding the differences between these two illustrative forms of copper polyphthalocryanine, each of them, when activated by an aromatic heterocyclic amine, forms a catalyst whose activity far surpasses that of any of its components.

DESCRIPTION OF THE PREFERRED EMBODIMENTS

The secondary and tertiary alkyl aromatic hydrocarbons employed as the starting materials in the process of this invention have the following structural formula:

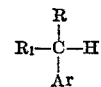

wherein R is lower alkyl; $R_1$ is lower alkyl or hydrogen; Ar is a substituted or unsubstituted aromatic nucleus such as phenyl or naphthyl; and R and $R_1$ taken together form a cycloalkyl ring having from 4 to 7 carbon atoms; and wherein R and $R_1$ may be the same or different alkyl groups. The aromatic nucleus may be substituted by such groups as lower alkyl, lower alkoxy, halo, nitro or cyano radicals. Preferably, the secondary or tertiary alkyl aromatic is represented by such compounds as cumene or ethylbenzene, although it is understood that compounds such as p-diisopropylbenzene, sec.-butylbenzene, isopropylnaphthalene, p-cymene and the like may also be utilized. Moreover, it has been found that this process is equally effective in oxidizing cycloalkyl aromatics such as phenylcyclohexane. Thus, for purposes of this invention cycloalkyl groups which are substituted for R and $R_1$ taken together, react as tertiary alkyl compounds.

The process of this invention, utilizing the afore-described catalyst, is conveniently carried out by the rapid passage of oxygen or air through a suitable reactor, to which has first been added a solution of the alkyl aromatic and the copper polyphthalocyanine-heterocyclic amine catalyst. The air or oxygen should be brought into intimate contact with the liquid phase, for example, by the use of high speed stirrers, suitable nozzles or the like.

The amount of catalyst employed will vary depending upon the nature and amount of material to be oxidized. In general, however, the amount of catalyst may vary from about 0.05 grams to 2.0 grams of catalyst per mole of substrate, and preferably should be from 0.1 to 1.0 grams per mole of substrate.

The rate of input of oxygen or air will depend upon the temperature and pressure utilized during he oxidation. There should be provided at least one amount theoretically sufficient to convert the alkyl-substituted aromatic compound completely to the corresponding hydroperoxide, and preferably an excess of this amount. It has been found that a flow rate ranging from 0.5 to 300 liters per hour is generally sufficient for most conversions. Any uncombined oxygen may, of course, be recycled to the reactor. The reaction may be effected at normal or superatmospheric pressure.

The reaction temperature may range from about 80 to 130° C., but is preferably in the range of from 90 to 115° C. While it has been found that the rate of conversion of substrate to hydroperoxide may initially be increased at temperatures over about 115° C., this is accomplished only at the expense of some of the remaining substrate which is converted into unwanted by-products.

The reaction is generally complete in from one to ten hours, depending upon the amount of substrate employed. It is preferred, however, that the reaction be terminated after a period of two to three hours in order to avoid excessive decomposition of the hydroperoxide, in which case unreacted starting material is readily recovered and recycled to the reactor.

Advantageously, small amounts of the hydroperoxide corresponding to the desired product may be introduced into the reaction medium to act as a reaction initiator. Thus, for example, when cumene is being oxidized, it has been found to be advantageous to add a small amount of cumyl hydroperoxide in order to initiate the reaction. As an accelerator there may also be introduced into the reaction medium alkali metal salts such as sodium or potassium carbonate, which, it has been found, further accelerates the oxidation of such starting materials as phenyl-cyclohexane. The amounts of these materials to be added are not critical, but 0.25 to 3 percent by weight of starting material is preferred.

The resulting hydroperoxide product is readily recovered from the reaction medium by conventional methods. Thus, for example, hydroperoxide may be conveniently recovered by isolating it as its sodium salt by addition of concentrated aqueous NaOH to the reaction product.

The hydroperoxides obtained by the process of this invention are highly useful in various important commercial applications. Thus, for example, when cumene is oxidized in accordance with the present invention, there is formed α-cumyl hydroperoxide which, when reacted with an acid such as sulfuric acid, is converted to industrially useful phenol and acetone in accordance with the following reaction.

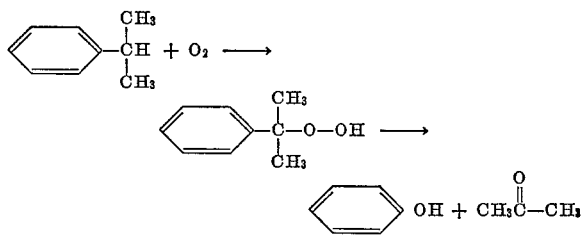

PREPARATION OF TWO TYPES OF COPPPER POLYPHTHALOCYANINE (A) Preparation of copper polyphthalocyanine from pyromellitic dianhydride (PMDA)

PMDA (184 mmoles), anhydrous $CuCl_2$ (120 mmoles), urea (3.60 moles) and $(NH_4)_2MoO_4$ (0.1 g). were intimately blended and heated at 180 to 185° C. for 2 hours. The black solid was washed with $H_2O$ (0.5 l.) and then dissolved in concentrated $H_2SO_4$ (200 ml.) at room temperature. The dark solution was slowly added to cracked ice and water (3 l.). A fine precipitate was readily obtained. The solids were filtered and washed with $H_2O$ until the washings were neutral. The dried solids were extracted with pyridine, and then dried with a sublimator at 240° C. (0.1 mm. Hg) until solids no longer appeared on the cold finger. The navy blue product was partially soluble in DMF. The I.R. spectrum closely resembles the pyromellitonitrile derived compound except for the absence of the nitrile group and the appearance of a carbonyl doublet indicative of anhydride end groups. The strong carbonyl bands suggest a low molecular weight polymer. This lower molecular weight is supported by the solubility of the compound in DMF and concentrated $H_2SO_4$.

Elemental analysis for a completely branched structure follows:

Calculated (percent): C=55.7, H=0.93, N=21.7, Cu =11.6. Found (percent): C=52.1, H=2.02, N=20.7, Cu=6.54. Surface area=7.1 square meters per gram.

(B) Preparation of copper polyphthalocyanine from pyromellitonitrile

A heavy-walled glass tube was charged with pyromellitonitrile (11.0 mmoles) $Cu_2Cl_2$ (6.5 mmoles) and urea (2.0 mmoles). The mixture was intimately ground in a mortar before charging. The tube was thoroughly flushed with helium and sealed. It was heated at 390° C. for 19 hours. The fused, hard, black solid was extracted with pyridine and then washed alternately with ethanol and water until there was no detectable odor of pyridine or color to the washes. The purple solid was heated in a sublimator at 240° C. and 0.1 to 0.5 mm. Hg for several days until impurities cease to sublime. The product was a navy blue, metallic powder. Yield=2.1 g. It was insoluble in all solvents including concentrated $H_2SO_4$ at room temperature.

Elemental analysis is in accord with the proposed rectilinear structure.

Calculated (percent): C=55.3, H=0.92, N=29.0, Cu=14.7. Found (percent): C=53.3, H=1.55, N=25.5, Cu=14.1. Surface area of the catalysts is 6.7 square meters per gram.

EXAMPLES

The following reactions were carried out in a 50 ml. resin pot immersed in a thermostated oil bath. The pot was fitted with a hollow stirrer shaft through which oxygen could be added and dispersed through the agitated system. The apparatus was otherwise fitted with a water-cooled reflux condenser and vented to the atmosphere through a mineral oil or mercury bubbler. Oxygen pressure was maintained at about 1 atmosphere by a rapid flow-through of 60 mls./min.

Unless otherwise noted, cumene (200 mmoles) was used with cumene hydroperoxide (1 mole percent) as a promoter and 0.25 weight percent (ca. 0.1 mmoles) catalyst in suspension. Pyridine content was generally 57 mg. and except in Examples 1 to 7, it was added to the agitated system (ca. 450 r.p.m.) after all other reagents were present.

The reaction was followed for hydroperoxide formation by removing 0.2 ml. aliquots of solution and titrating iodometrically with 0.01 N $Na_2S_2O_3$.

For selectivity studies, the reaction was carried out in a closed flask fitted to a gas buret. Selectivity was determined by comparing oxygen uptake (conversion) against hydroperoxide production as measured iodometrically.

The selectivity measurements (mole percent) shown in the last column in Tables I and II, and mentioned elsewhere represent measurements taken during the first hour only. For longer periods, it will be understood that a decrease in hydroperoxide concentration takes place, which decerase follows known kinetics for this type of reaction in that the selectivity of the hydroperoxide drops with increasing concentrations of this product.

In the following tables and discussions, these abbreviations have been used:

CuPC—Copper phthalocyanine
CuPPC—Copper polyphthalocyanine

Also, in certain of the following tables, where conditions were otherwise the same, some of the examples have been repeated for sake of comparison.

EXAMPLES 1 to 7

Table I summarizes the activity of CuPPC prepared from pyromellitonitrile and containing 57 mg. of residual pyridine (i.e. no additional pyridine has been added to the system) shown in Examples 2, 4 and 6, as compared to the activity of CuPC (Examples 1, 3 and 5), NaOH (Example 7) and CuPPC wherein all the pyridine has been removed (Example 7A). The very low order of activity during the first two hours of this latter run will be evident, particularly in comparison with the marked increase in rate during the third hour, after pyridine was added for sake of this comparison.

TABLE I

| Ex. | Catalyst system | Reaction temp., °C. | Reaction time, hrs. | | | | Selectivity, mole percent [1] |
|---|---|---|---|---|---|---|---|
| | | | 1 | 2 | 3 | 4 | |
| | | | Cumene hydroperoxide, mole percent of theoretical | | | | |
| 1 | CuPC | 80 | 1.24 | 2.47 | 4.96 | 6.00 | 100 |
| 2 | CuPPC plus pyridine | 80 | | 2.30 | | 4.20 | 100 |
| 3 | CuPC | 105 | 2.50 | 3.75 | 6.85 | 9.85 | 100 |
| 4 | CuPCC plus pyridine | 105 | 9.68 | 18.3 | 24.6 | 32.7 | 100 |
| 5 | CuPC | 125 | 9.50 | 21.1 | 30.8 | 43.1 | 95.5 |
| 6 | CuPPC plus pyridine | 125 | 15.3 | 24.5 | 35.7 | 43.3 | 96.6 |
| 7 | Aq. NaOH [2] | 130 | 5.54 | 24.6 | 31.6 | 42.6 | 88.2 |
| 7A | CuPPC [3] | 105 | 0.81 | 1.53 | [4] 8.15 | | |

[1] Measured during first hour.
[2] 0.01 ml. 20 percent aq. NaOH/200 mls. cumene.
[3] Prepared in accordance with preparation "B," page 11 (supra), wherein all pyridine was removed.
[4] 56.9 mg. of pyridine added at beginning of third hour.

EXAMPLES 8–15

Table II illustrates the decline of CuPPC activity, and its restoration by the addition of pyridine. CuPPC used in these reactions is prepared by pyromellitronitrile. The reactions were all carried out at 105° C.

TABLE II

| Ex. | Catalyst system | Reaction temp., °C. | Reaction time, hrs. | | | | Selectivity, mole percent [1] |
|---|---|---|---|---|---|---|---|
| | | | 1 | 2 | 3 | 4 | |
| | | | Cumene hydroperoxide, mole percent of theoretical | | | | |
| 8 | CuPPC [2] | | 9.68 | 18.3 | 24.6 | 32.7 | 100 |
| 9 | CuPPC [3] | | 1.55 | 1.65 | 2.40 | 3.75 | 100 |
| 10 | CuPPC [3] | | 0.60 | 1.70 | [4] 8.15 | | |
| 11 | CuPPC [3] plus pyridine [5] | | 6.95 | 16.6 | 26.6 | 36.6 | 100 |
| 12 | CuPC plus pyridine [5] | | 1.85 | 4.75 | 7.35 | 10.4 | 100 |
| 13 | CuPC | | 2.50 | 3.75 | 6.85 | 9.85 | 100 |
| 14 | Pyridine | | 2.05 | 3.95 | [6] 10.4 | | |
| 15 | CuPPC [7] | | 1.50 | 1.60 | 2.35 | 3.70 | 100 |

[1] Measured during first hour.
[2] Freshly prepared sample containing endogenous pyridine (57 mg.).
[3] Catalyst sample after 4 months shelf life.
[4] Addition of pyridine (57 mg.) after 2 hours reaction time.
[5] Pyridine (57 mg.) added at start of reaction.
[6] CuPPC from PMDA added after 2 hours reaction time.
[7] CuPPC prepared in accordance with U.S. Pat. No. 3,300,339.

From the foregoing data, it can be seen that there is no interaction between pyridine and CuPC as there is between the former and CuPPC to give enhanced activity. In fact, the similarity in activity between CuPC plus pyridine and pyridine, per se, suggests that CuPc is entirely coordinated by pyridine and it is the excess base that is catalyzing the reaction. The restoration of CuPPC activity by addition of pyridine during the third hour of the reaction shows the need of the latter for superior activity. This need for pyridine is further demonstrated in the reaction where pyridine and CuPPC are both present initially. Not only is selectivity still 100% with the CuPPC-pyridine system, but catalytic activity is brought back to substantially the same level as initially.

EXAMPLES 16–20

Table III illustrates the effectiveness of the heterocyclic amine quinoline as compared to other catalyst systems.

TABLE III

| Ex. | Catalyst system [1] | Reaction time, hrs. | | | |
|---|---|---|---|---|---|
| | | 1 | 2 | 3 | 4 |
| | | Cumene hydroperoxide, mole percent of theoretical | | | |
| 16 | CuPPC plus pyridine [2] | 6.95 | 16.6 | 26.6 | 36.6 |
| 17 | CuPPC plus quinoline [2] | 5.20 | 12.1 | 21.4 | |
| 18 | CuPPC plus N,N-dimethyl-t-butylamine. [2] | 0.34 | 0.57 | | |
| 19 | CuPPC plus aq. NaOH [3] | 2.40 | 7.45 | 11.9 | 16.2 |
| 20 | CuPC | 2.50 | 3.75 | 6.85 | 9.85 |

[1] 105° C. reaction temperature.
[2] 57 mg. used.
[3] 0.01 ml. of 20% aq. NaOH.

The activity of quinoline and pyridine are quite similar, which indicates that the CuPPC catalytic system is useful with the general class of armoatic heterocyclic amines. The ineffectiveness of aliphatic amines is shown by the action of N,N-dimethyl-t-butylamine which appears to be an inhibitor. Alkali metal hydroxides have marginal utility. They are at least 50% less effective than the heterocyclic amines.

EXAMPLE 21

An experiment was run to determine how long a single batch of catalyst could be re-used until its activity was lost. Toward this end, a reaction was run for a period of 2 hours at the end of which one-half the mother liquor was siphoned off and replaced by fresh cumene. The rate of hydroperoxide production was followed iodometrically. The process was conducted at 105° with CuPPC containing pyridine (7:1 mole ratio). The data are summarized in Table IV.

TABLE IV

| Cycle: | Mole percent cumene hydroperoxide |
|---|---|
| 1 | 11.6 |
| 2 | 12.5 |
| 3 | 12.2 |
| 4 | 13.8 |
| 5 | 10.3 |
| 6 | 9.6 |
| 7 | 7.0 |
| 8 | [a] 11.9 |
| 9 | 17.3 |
| 10 | 14.4 |
| 11 | 13.4 |
| 12 | 10.7 |
| 13 | 12.1 |
| 14 | 8.1 |

[a] Additional pyridine (57 mg.) added.

As will be seen from the above data, there was no strong decline in conversion until the seventh cycle at the end of which fresh pyridine was added. This readily restored the rate to the initial level. Of the original CuPPC (60 mg.), 51 mg. were recovered. Its I.R. was identical to its original spectra. The loss of 9 mg. is believed to be mechanical. Total production of cumene hydroperoxide was 0.329 mole. Thus, it is evident that the catalyst can be used indefinitely with only the need for trace addition of pyridine. Only 57 mg. of the latter was used up in this continuous process.

These data support the conclusion that pyridine forms an insoluble complex with the catalyst. If this were not the case, activity should have declined sharply by the third cycle as this would have constituted a dilution of soluble pyridine in the amount of about 1:8.

EXAMPLE 22

To a 200 ml. resin pot equipped with a reflux condenser, mechanical stirrer, and inlet for oxygen was added 200 mmoles of cumene, 60 mg. of copper phthalocyanine and 2 mmoles of cumyl hydroperoxide. Oxygen was rapidly passed through the system at 60 ml./min. Agitation was maintained at 400–500 r.p.m. at a temperature of 105° C. The progress of the reaction was followed by iodometric titration of the hydroperoxide which was produced.

The reaction was then repeated substituting as the catalyst, first, copper polyphthalocyanine prepared from pyromellitic dianhydride, and then copper polyphthalocyanine prepared from pyromellitonitrile which contained 55 mg. of pyridine. The comparison of the yields of α-cumyl hydroperoxide obtained from each of these catalysts was as follows:

|  | Mmoles of hydroperoxide | | |
|---|---|---|---|
| Reaction time, hours | 1 | 2 | 3 |
| Catalyst: | | | |
| Copper phthalocyanine | 7.10 | 14.2 | 20.0 |
| Copper polyphthalocyanine (from pyromellitic dianhydride) | 6.46 | 11.4 | 17.48 |
| Copper polyphthalocyanine-pyridine | 19.4 | 36.6 | 61.4 |

Analysis of the reaction product from the latter catalyst revealed that no by-products were produced and that only α-cumyl hydroperoxide was obtained.

EXAMPLE 23

Repeating the procedures of Example 22, 200 mmoles of phenylcyclohexane, 2 mmoles of cumyl hydroperoxide, and 320 mg. of $K_2CO_3$ were charged to the reactor together with 60 mg. of copper phthalocyanine. The reaction mixture was heated at 100° C. with the passage of oxygen through the system at 60 ml./min.

This reaction was then repeated wherein no catalyst at all was employed except for the $K_2CO_3$ and a further reaction was run with copper polyphthalocyanine prepared from pyromellitonitrile, and containing 56 mg. triazine.

The yield of phenylcyclohexyl 1-hydroperoxide was as follows:

|  | Mmoles of hydroperoxide | |
|---|---|---|
| Reaction time, hours | 3.0 | 4.5 |
| Catalyst: | | |
| None ($K_2CO_3$ only) | 3.6 | 4.8 |
| Copper phthalocyanine | 11.3 | 17.95 |
| Copper polyphthalocyanine-triazine | 14.2 | 21.93 |

Analysis of the latter reaction medium revealed no other products than the desired hydroperoxide.

EXAMPLE 24

Repeating the procedures of Example 22, 200 mmoles of ethylbenzene, 2 mmoles of cumyl hydroperoxide and 60 mg. of copper polyphthalocyanine from pyromellitic dianhydride were charged to the reactor which was heated at 105° C. while oxygen was passed through the system at 60 ml./min.

The above procedure was repeated substituting the pyridine-containing copper polyphthalocyanine from pyromellitonitrile for the first catalyst, which contained no pyridine. The yield of ethylbenzene 1-hydroperoxide was found to be as follows:

|  | Mmoles of hydroperoxide | |
|---|---|---|
| Reaction time, hours | 3.0 | 6.0 |
| Catalyst: | | |
| Copper polyphthalocyanine from pyromellitic dianhydride | 3.10 | 4.97 |
| Copper polyphthalocyanine-pyridine | 4.50 | 7.06 |

Further analysis of the latter reaction product revealed no other products than the desired hydroperoxide.

EXAMPLE 25

Repeating the procedure of Example 22 but using only pyridine containing cupric polyphthalocyanine prepared from pyromellitonitrile as the catalyst, 200 mmoles of m-diisopropylbenzene, 2 mmoles of cumyl hydroperoxide and 60 mg. of the above catalyst were charged to the reactor which was heated to 105° C. while oxygen was passed through the system at 60 ml./min. The reaction medium yielded a mixture of the mono- and di-hydroperoxide or diisopropylbenzene in the following amounts:

| Reaction time, hours: | Mmoles, hydroperoxide |
|---|---|
| 2 | 23.4 |
| 4 | 44.7 |
| 6 | 76.0 |

EXAMPLE 26

Repeating the procedures of Example 22, but substituting β-sec.-butylnaphthalene for cumene as the starting material, ten millimoles of β-sec.-butylnaphthalene hydroperoxide were obtained after five hours using CuPPC-pyridine as the catalyst. When CuPC and CuPPC containing no pyridine were substituted as the catalysts, only trace amounts of the hydroperoxide were obtained.

It will be seen from the foregoing data that the activity of copper phthalocyanines which have been contacted with aromatic amines remains wholly unaffected whereas the activity of the copper polyphthalocyanine catalysts which have been activated with aromatic heterocyclic amines are greatly superior to those other copper phthalocyanine or polyphthalocyanine catalysts in increasing the reaction rate for the oxidation of secondary and tertiary alkyl aromatics to form the corresponding hydroperoxides. Thus, as the examples show, conversion to the hydroperoxide can, in many cases, proceed at more than 9 percent per hour during the start-up period, which is approximately a three-fold gain on a weight basis, over any of the other related catalysts of the prior art.

What is claimed is:

1. A process for the oxidation of secondary and tertiary alkyl aromatic hydrocarbon to produce the corresponding hydroperoxide which comprises contacting said alkyl aromatic hydrocarbon having the structural formula:

in which R is lower alkyl; $R_1$ is selected from the group consisting of hydrogen and lower alkyl; R and $R_1$, taken together form a cycloalkyl ring having from 4 to 7 carbon atoms; and Ar is an aromatic nucleus selected from the group consisting of phenyl and naphthyl, with oxygen at temperatures of from about 90 to 115° C. in the presence of a catalyst comprising a copper polyphthalocyanine and an aromatic heterocyclic amine selected from the group consisting of pyridine, quinoline, isoquinoline, triazine and pyrazine, wherein the weight ratio of said amine to said polyphthalocyanine is between about 0.7:1 and 2:1.

2. The process according to claim 1 wherein the aromatic heterocyclic amine is pyridine.

3. The process according to claim 1 wherein the aromatic heterocyclic amine is quinoline.

4. The process according to claim 1 wherein the weight ratio of aromatic heterocyclic amine to copper polyphthalocyanine is between about 0.2:1 and 1:1.

5. The process according to claim 1 wherein the aromatic heterocyclic amine is added to the reaction mixture containing a partially deactivated copper polyphthalocyanine-aromatic heterocyclic amine catalyst.

6. The process according to claim 1 in which the reaction is carried out in the presence of an added hydroperoxide.

7. The process according to claim 1 in which the reaction is carried out in the presence of an added alkali metal salt.

8. The process according to claim 1 in which the alkyl aromatic compound is cumene and the hydroperoxide is α-cumyl hydroperoxide.

9. The process according to claim 1 in which the alkyl aromatic compound is ethylbenzene and the hydroperoxide is ethylbenzene 1-hydroperoxide.

10. The process according to claim 1 in which the alkyl aromatic compound is phenylcyclohexane and the hydroperoxide is phenylcyclohexyl 1-hydroperoxide.

11. In the process according to claim 1 for the oxidation of secondary and tertiary alkyl aromatic hydrocarbons wherein the catalyst employed is copper polyphthalocyanine activated with an aromatic heterocyclic amine, the step which comprises adding said amine to the reaction medium when necessary in order to maintain the weight ratio of amine to copper polyphthalocyanine at between 0.07:1 and 2:1.

References Cited

UNITED STATES PATENTS

| | | | |
|---|---|---|---|
| 2,734,086 | 2/1956 | Goppel et al. | 260—610 B |
| 2,954,405 | 9/1960 | Hock | 260—610 B |
| 3,300,399 | 1/1967 | Wildi et al. | 260—610 R |

FOREIGN PATENTS

| | | | |
|---|---|---|---|
| 558,506 | 6/1958 | Canada | 260—610 B |

OTHER REFERENCES

Cook: "J. Chem. Soc.," July–December 1938, pp. 1766–1767.

Moser et al.: "Phthalocyanine Compounds," Reinhold Pub. Co., N.Y. (1963), pp. 328–336.

BERNARD HELFIN, Primary Examiner

W. B. LONE, Assistant Examiner

U.S. Cl. X.R.

260—621 R, 593 A